No. 691,485. Patented Jan. 21, 1902.
O. PORBECK.
DUST COLLECTOR.
(Application filed Aug. 8, 1900.)
(No Model.)
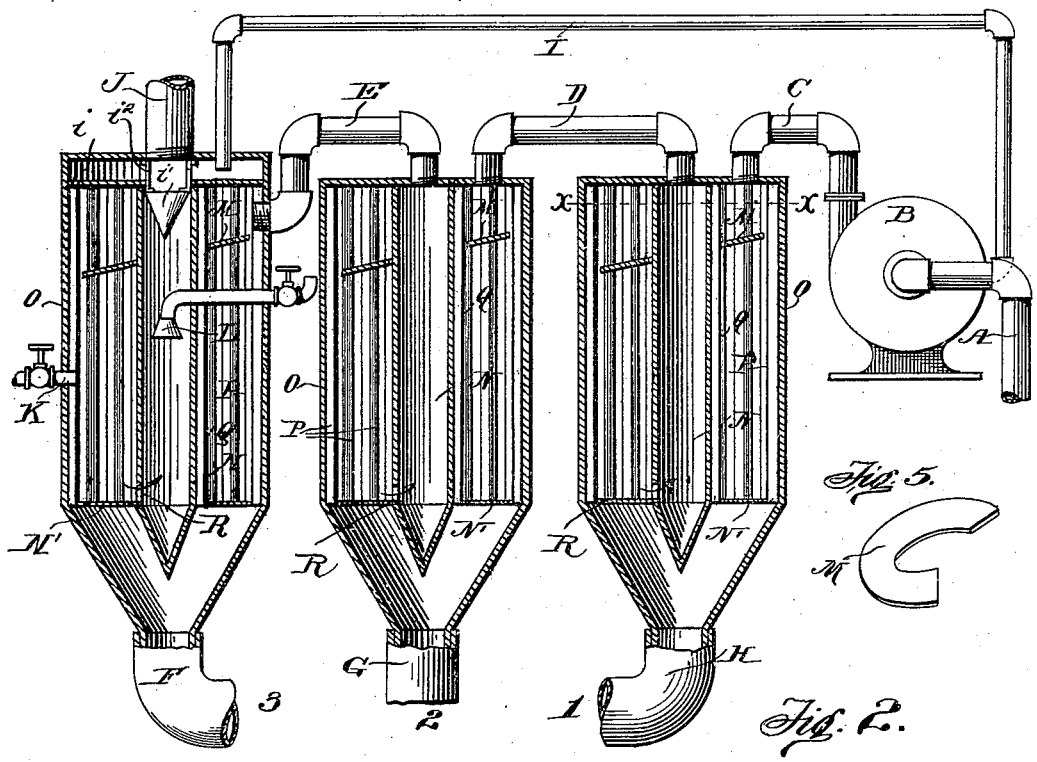
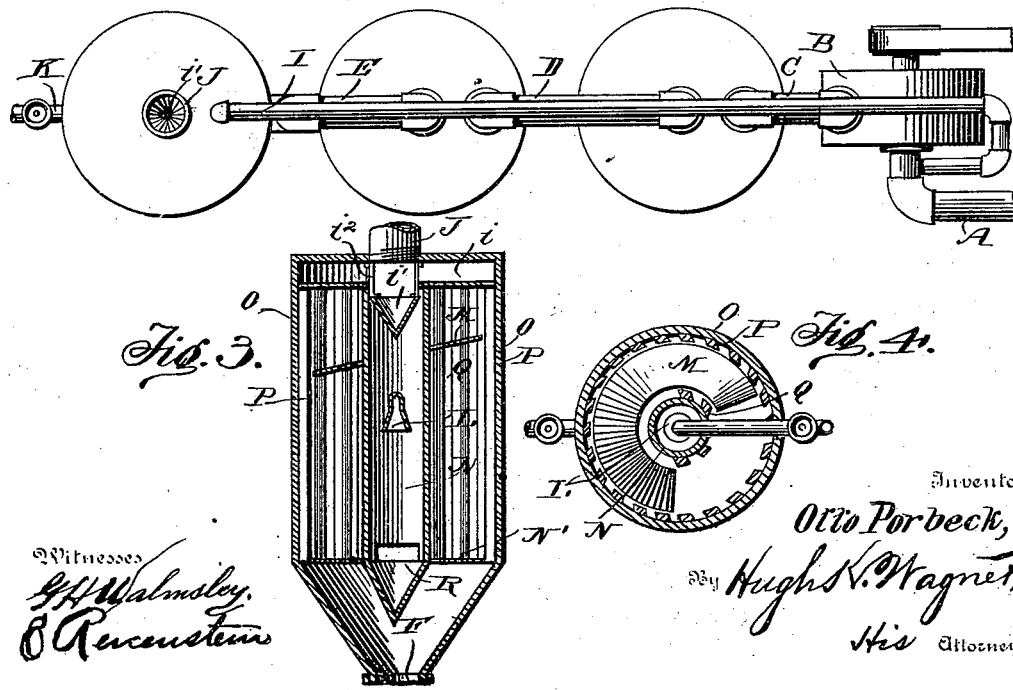

UNITED STATES PATENT OFFICE.

OTTO PORBECK, OF ST. LOUIS, MISSOURI.

DUST-COLLECTOR.

SPECIFICATION forming part of Letters Patent No. 691,485, dated January 21, 1902.

Application filed August 8, 1900. Serial No. 26,221. (No model.)

*To all whom it may concern:*

Be it known that I, OTTO PORBECK, a citizen of the United States, residing at the city of St. Louis, State of Missouri, (whose post-office address is St. Louis, Missouri,) have invented a certain new and useful Improvement in Dust-Collectors, of which the following is a full, clear, and exact description, such as will enable others skilled in the art to which it appertains to make and use the same, reference being had to the accompanying drawings, forming a part of this specification, in which—

Figure 1 is a longitudinal vertical section with minor parts in elevation. Fig. 2 is a top plan view of the system. Fig. 3 is a longitudinal sectional view of the last collector of the system, said section being taken at right angles to the section shown in Fig. 1. Fig. 4 is a top view, partially in section, of the inner and outer hoppers of one of said dust-collectors on the line $x\ x$, Fig. 1. Fig. 5 is a detail view showing, in perspective, the spiral deflecting-plate.

The object of my said improvement in dust-collectors is to provide means whereby greater efficiency in dust-collection and analogous service may be obtained, so that the precipitation or collection of the finest particles of dust or other substance may be complete even to the finest particles.

My invention is adapted to a variety of uses and is not to be confined alone to the collection of dust, but can in some of its parts or by slight adaptation act as an efficient steam-separator.

In my system of dust collection or separation of analogous substances, A is a pipe leading to the source of the substance to be separated. The pipe A enters the fan B, which in turn blows such substance (which I shall hereinafter speak of as "dust" for the sake of convenience, not of limitation) throughout my series of collectors. Said series may consist of two, three, or more dust-collectors, as desired, and said dust-collectors may be of the same size or may be graded, so that the largest will be placed next the fan and the smallest at the greatest distance from the fan, for the reason that the blast of the fan will naturally be strongest in the first one of the series and weakest in the last, while at the same time the amount of dust to be collected will be greater in the beginning of the operation (in the first collector) than in the last collector of the series, where practically nothing but fine dust will remain to be separated. In the drawings I have shown a series of three dust-collectors by way of illustration, which I have numbered 1, 2, and 3. The fan B then blows the dust through pipe C into collector 1, which it enters at its upper part. In this collector, the construction of which may be of various forms, but preferably of the kind hereinafter more particularly described, some of the dust will be separated and precipitated for collection, as hereinafter described; but some will also rise in the air (see arrow at R, Fig. 1, collector 1) and be blown through pipe D into collector 2, and again that unseparated in collector 2 through pipe E into collector 3. In collector 3 are suitably located two spray-pipes K and L, through which steam in a suitable state or other proper fluid can be introduced to moisten the remaining fine particles and by thus increasing their weight cause their separation from the air which surrounds them, said particles being precipitated to the bottom of the collector 3 and conducted by pipe F to the common receptacle (not shown) of pipes F, G, and H. By this system and procedure it is practically impossible for any of even the finest particles of dust or more valuable materials (*e. g.*, carbon) to escape into the atmosphere through the pipe J, which is the final exit for the air-blast. To guard against even this possibility, I provide the air-chamber $i$ at the top of collector 3, into which the deflector-plate $i'$ causes the rising air, &c., to flow, carrying with it any residue of unseparated particles, and as the air and carried particles are first deflected toward the circumference of said air-chamber the suction-pipe I, which leads back to the fan B, absorbs such particles of dust as are carried by the air, leading same to the fan whence they originally came and subjecting them to another trip through the system. As the deflector-plate $i'$ is attached to the upper part of the casing forming said air-chamber $i$ merely by narrow bands $i^2$, placed at intervals, it is obvious that any air not affected by the action of said suction-pipe H will escape through the spaces between said bands into the atmosphere through pipe J. By the efficiency of the construction of each collector, however, (which, as hereinafter described, is novel in itself,) by the utilization of a series of two or more collectors, by the introduction of a spray or sprays of suitable steam or other proper fluid, and, last, by the provision of the air-chamber and suction-pipe, whereby most of the escaping air, possibly carrying unseparated particles, is returned to the fan by the pipe H and thence forced again through the series of collectors, it is obvious that the waste of valuable material through pipe J must be small indeed.

When the dust-laden air enters collector 1 through pipe C, it strikes a spiral plate M, located near the top of said hopper, which imparts to the onward rush of said dust-carrying air a centrifugal motion, the plate being so formed. The tendency of both air and dust is at this time downward, as well. Said collector consists of an inner hopper or cylinder N and an outer one O, both provided with conical bases to receive the collections. The inner wall of the outer cylinder or hopper and the outer wall of the inner cylinder or hopper have attached thereto fins, flanges, or projections, (a small distance only being between each,) said flanges being lettered P on the inner wall of the outer cylinder and Q on the outer wall of the inner cylinder. It will be noted that said flanges extend but approximately half-way around said inner hopper, (see Fig. 2,) the principal action of the centrifugal motion given to the air and dust being to throw the dust into the interstices between the aforesaid flanges, where, being sheltered from the further action of the air, the dust naturally and easily settles to the bottom. The air, however, being still impelled onward by the fan, finds its escape through the opening R in the inner cylinder and thence upward and out through pipe D from the first into the second collector, and through pipe E from the second into the third collector, as will be readily understood.

I claim—

1. A dust-collector consisting of a blast-fan, two annular chambers arranged one within the other closed at their upper and lower ends, the inner chamber having an outlet in its upper wall and the outer chamber having its bottom wall extended below the bottom wall of the inner chamber and provided with an outlet, said chambers communicating with each other near their lower ends, a communication between the blast-fan and the outer chamber at the upper end of the latter and at a point opposite to the communication between said chamber and the inner chamber, a spiral flange arranged in said outer chamber in close proximity to said communication with the fan, vertically-arranged inclined flanges on the inner wall of the outer chamber and the outer wall of the inner chamber, and a diaphragm closing the lower end of the outer chamber and formed with openings beneath the lower ends of said flanges, substantially as described.

2. A dust-collector comprising a blast-fan, two annular chambers arranged one within the other and communicating with each other near their lower ends, the inner chamber having an outlet at its upper end, a communication between the fan and the outer chamber at the upper end of the latter, a spiral flange in said outer chamber having its upper end in proximity to said communication, an annular chamber at the upper end of and closing the outer chamber and communicating with the inner chamber and having an outlet in line with the outlet of said chamber, a deflector arranged in the inner chamber below the outlet therein, and a pipe establishing communication between said upper chamber and the fan, substantially as described.

3. A dust-collector system consisting of a series of collectors, each comprising two annular chambers arranged one within the other, said chambers communicating with each other at their lower ends, the outer chamber having a funnel-shaped bottom wall provided with an outlet, a blast-fan, a communication between said fan and the outer chamber of the first collector at the upper end thereof, a communication between the inner chamber of each of the collectors and the outer chamber of the adjacent collector excepting the last collector of the series, a chamber at the upper end of said last collector communicating with the inner chamber thereof and provided with an outlet in line with the communication with said inner chamber, a deflector in the inner chamber below its communication with the upper chamber, a pipe leading from the upper chamber to the blast-fan, vertical flanges on the inner walls of the outer chambers and the outer walls of the inner chambers, and diaphragms closing the lower ends of the outer chambers and having openings beneath the lower ends of said vertical flanges, substantially as described.

In testimony whereof I have hereunto affixed my signature, in the presence of two witnesses, this 29th day of June, 1900.

OTTO PORBECK.

Witnesses:
HUGH K. WAGNER,
HENRY FOERSTER.